United States Patent
Jana et al.

(10) Patent No.: US 10,425,256 B2
(45) Date of Patent: Sep. 24, 2019

(54) METHODS AND SYSTEMS FOR INTERFERENCE MITIGATION IN A DUAL-POLARIZED COMMUNICATION SYSTEM

(71) Applicants: Mrinmoy Jana, Vancouver (CA); Jeebak Mitra, Ottawa (CA); Lutz Hans-Joachim Lampe, Vancouver (CA)

(72) Inventors: Mrinmoy Jana, Vancouver (CA); Jeebak Mitra, Ottawa (CA); Lutz Hans-Joachim Lampe, Vancouver (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 0 days.

(21) Appl. No.: 15/889,919

(22) Filed: Feb. 6, 2018

(65) Prior Publication Data
US 2019/0245718 A1    Aug. 8, 2019

(51) Int. Cl.
*H04L 25/03* (2006.01)
*H04B 7/0408* (2017.01)

(52) U.S. Cl.
CPC ..... *H04L 25/03057* (2013.01); *H04B 7/0408* (2013.01); *H04L 25/03038* (2013.01); *H04L 25/03343* (2013.01); *H04L 2025/03573* (2013.01)

(58) Field of Classification Search
CPC ........ H04L 25/03057; H04L 25/03273; H04L 25/03038; H04L 25/03885; H04L 25/03343; H04L 43/028; H04L 2025/0349; H04L 2025/03509; H04L 25/085; H03H 21/0012
See application file for complete search history.

(56) References Cited

U.S. PATENT DOCUMENTS

| | | | | |
|---|---|---|---|---|
| 4,644,562 | A * | 2/1987 | Kavehrad | H04B 7/002 375/232 |
| 5,283,811 | A * | 2/1994 | Chennakeshu | H03H 21/003 375/233 |
| 6,115,419 | A * | 9/2000 | Meehan | H01Q 3/2611 348/725 |
| 6,226,323 | B1 * | 5/2001 | Tan | H04B 1/68 348/E5.084 |
| 6,240,133 | B1 * | 5/2001 | Sommer | H03H 21/0012 333/28 R |

(Continued)

*Primary Examiner* — Khanh C Tran

(57) ABSTRACT

An interference mitigation apparatus, comprising: an adaptive feedforward filtering stage and an adaptive feedback filtering stage configured to produce a plurality of output signals from a plurality of frequency downconverted signals, the output signals for being provided to a data decoding stage; a plurality of phase rotators configured to apply phase rotation to the frequency downconverted signals prior to processing by the adaptive feedforward filtering stage and the adaptive feedback filtering stage; and an adaptive controller configured for varying an amount of the phase rotation applied by the phase rotators to the frequency downconverted signals based at least in part on symbol decisions made on the output signals. There may be second phase rotators configured to apply phase rotation after the adaptive feedforward filtering stage so as to produce the output signals for forwarding to the data decoding stage.

28 Claims, 13 Drawing Sheets

(56) References Cited

U.S. PATENT DOCUMENTS

| | | | |
|---|---|---|---|
| 6,947,497 B1 * | 9/2005 | Ahn | H04L 25/03057 375/229 |
| 9,673,910 B1 * | 6/2017 | Crivelli | H04B 10/6162 |
| 2003/0165191 A1 * | 9/2003 | Kokuryo | H04L 25/03133 375/231 |
| 2017/0310373 A1 * | 10/2017 | Jana | H04L 25/03343 |

* cited by examiner

METHODS AND SYSTEMS FOR INTERFERENCE MITIGATION IN A DUAL-POLARIZED COMMUNICATION SYSTEM

FIELD

The present disclosure relates to dual-polarized communications systems and, in particular, to mitigation of interference present in such systems.

BACKGROUND

Bandwidth demands from various video-based and 5G applications are putting a significant strain on the current telecommunications infrastructure. Methods that provide high spectral efficiency will be critical for sustaining the high data rates needed by future networks. This can be achieved in part by a dual-polarization transmission system using higher-order modulation for symbols. In a dual-polarized system, two data streams are transmitted at the same carrier frequency by two polarizations, i.e., the horizontal (H) and the vertical (V) polarization. In theory, the two polarizations are orthogonal to each other, which offers a doubling of the data rate compared to single-polarized transmission. In practice, the polarizations may not be perfectly orthogonal, which may lead to energy leakage from one stream to another and cause cross-polarization interference. Since the receivers for each of the polarizations are synchronized to the corresponding transmitter the interference from the other polarization may appear at the receiver for the other polarization with a certain frequency offset distortions that arises due to imperfections in the transmitter and receiver local oscillators (LOs) leading to additional phase noise. Furthermore, adopting higher-order modulation may render the communication system more sensitive to phase noise (PN). Thus, it would be of value in the industry to mitigate cross-polarization interference and phase noise distortion, while developing still further ways of increasing the spectral efficiency.

SUMMARY

According to a first broad aspect, there is provided an interference mitigation apparatus, comprising: an adaptive feedforward filtering stage and an adaptive feedback filtering stage configured to produce a plurality of output signals from a plurality of frequency downconverted signals, the output signals for being provided to a data decoding stage; a plurality of phase rotators configured to apply phase rotation to the downconverted signals prior to processing by the adaptive feedforward filtering stage and the adaptive feedback filtering stage; and an adaptive controller configured for varying an amount of the phase rotation applied by the phase rotators to the downconverted signals based at least in part on symbol decisions made on the output signals.

According to a second broad aspect, there is provided an interference mitigation method, comprising: downconverting a plurality of modulated signals of respective polarizations to produce a corresponding plurality of downconverted signals; processing the downconverted signals with an adaptive feedforward filtering stage and an adaptive feedback filtering stage to produce a corresponding one of a plurality of output signals, the output signals for being provided to a data decoding stage; and applying phase rotation to the downconverted signals prior to said processing, wherein an amount of the phase rotation applied to the downconverted signals is adaptively controlled based at least in part on symbol decisions made on the output signals.

According to a third broad aspect, there is provided a communication system, comprising: a transmitter configured to send a plurality of orthogonally polarized signals containing transmit data using faster-than-Nyquist transmission; and a receiver comprising a plurality of orthogonally polarized antennas to produce a corresponding plurality of received signals from a composite received version of the polarized signals, the receiver configured to process each of the received signals by (i) applying adaptively controlled amounts of phase rotation; (ii) processing with an adaptive feedforward filtering stage; and (iii) processing with an adaptive feedback stage to obtain output signals, whereby the output signals are decoded by a data decoding stage to obtain estimates of the transmit data.

According to a fourth broad aspect, there is provided an interference mitigation method, comprising: downconverting a plurality of modulated wireless signals of respective polarizations to produce a corresponding plurality of downconverted signals; processing each of the downconverted signals to produce a corresponding one of a plurality of output signals in which there is less inter-symbol-interference and cross-polarization interference than in the downconverted signal, the output signals for being provided to a data decoding stage; applying phase rotation to the downconverted signals prior to said processing, wherein an amount of phase rotation is adaptively controlled based at least in part on symbol decisions made on the output signals.

According to a fifth broad aspect, there is provided an interference mitigating apparatus, comprising: an inter-symbol-interference (ISI) mitigation portion with a plurality of inputs and a plurality of outputs, the inputs for receiving corresponding demodulated signals of respective polarizations; a cross-polarization interference (XPI) mitigation portion with a plurality of inputs and a plurality of outputs, the inputs being connected respectively to the outputs of the ISI mitigation portion, the outputs of the XPI mitigation portion for being provided to a data decoding stage; and a plurality of phase rotators for phase rotating the demodulated signals provided to the inputs of the ISI mitigation portion, the phase rotators being adaptively controlled based at least in part on symbol decisions made on the outputs of the XPI mitigation portion.

BRIEF DESCRIPTION OF THE DRAWINGS

These and other non-limiting aspects and embodiments will be described below with reference to the accompanying drawings, in which.

DETAILED DESCRIPTION

Figure 1:
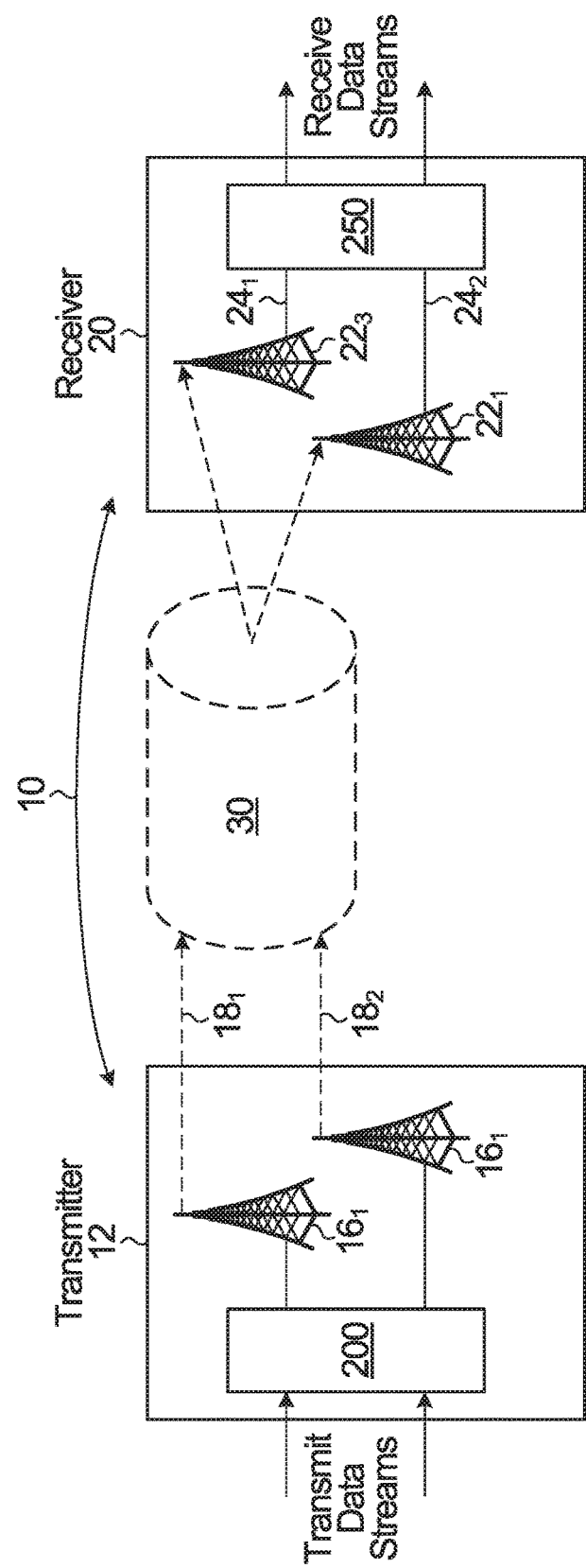
FIG. 1 is a block diagram illustrating certain components of a dual-polarization communication system, in accordance with an embodiment.

With reference to FIG. 1, there is shown a block diagram illustrating certain components of a dual-polarization communication system 10, which is in this case a microwave transmission system. A transmitter 12 receives a pair of transmit data streams which typically have binary values that are processed by a transmit chain 200 within the transmitter 12 to produce a pair of analog electrical transmit signals. A pair of transmit antennas $16_1$, $16_2$ is provided within the transmitter 12. The transmit antennas $16_1$, $16_2$ are configured to apply respective orthogonal polarizations to the pair of electrical transmit signals, resulting in the emission of a pair of wireless signals $18_1$, $18_2$ over a physical medium 30, such as air or a vacuum. The wireless signals $18_1$, $18_2$ may be radio-frequency signals modulated about a common carrier frequency. In an example, the two polarizations may be horizontal and vertical. Other embodiments may utilize other polarizations.

A composite radio-frequency signal (including wireless signals $18_1$, $18_2$ after having suffered the effects of multipath, attenuation, cross-talk and interference of various kinds while traversing through the link 30) is received at a receiver 20. The receiver 20 includes a pair of receive antennas $22_1$, $22_2$ which are polarized analogously to the transmit antennas $16_1$, $16_2$. The receive antennas $22_1$, $22_2$ are configured to convert the composite signal received at the receiver into a pair of electrical receive signals $24_1$, $24_2$. Each of the electrical receive signals $24_1$, $24_2$ includes a component due to wireless signal $18_1$ and a component due to wireless signal $18_2$, but in different proportions depending on the polarizations of the receive antennas $22_1$, $22_2$. The electrical receive signals $24_1$, $24_2$ are processed by a receive chain 250 within the receiver 20. The receive chain 250 is configured to produce a pair of receive data streams, which can then be processed and/or combined further downstream to produce a single stream of received data.

Figure 2:
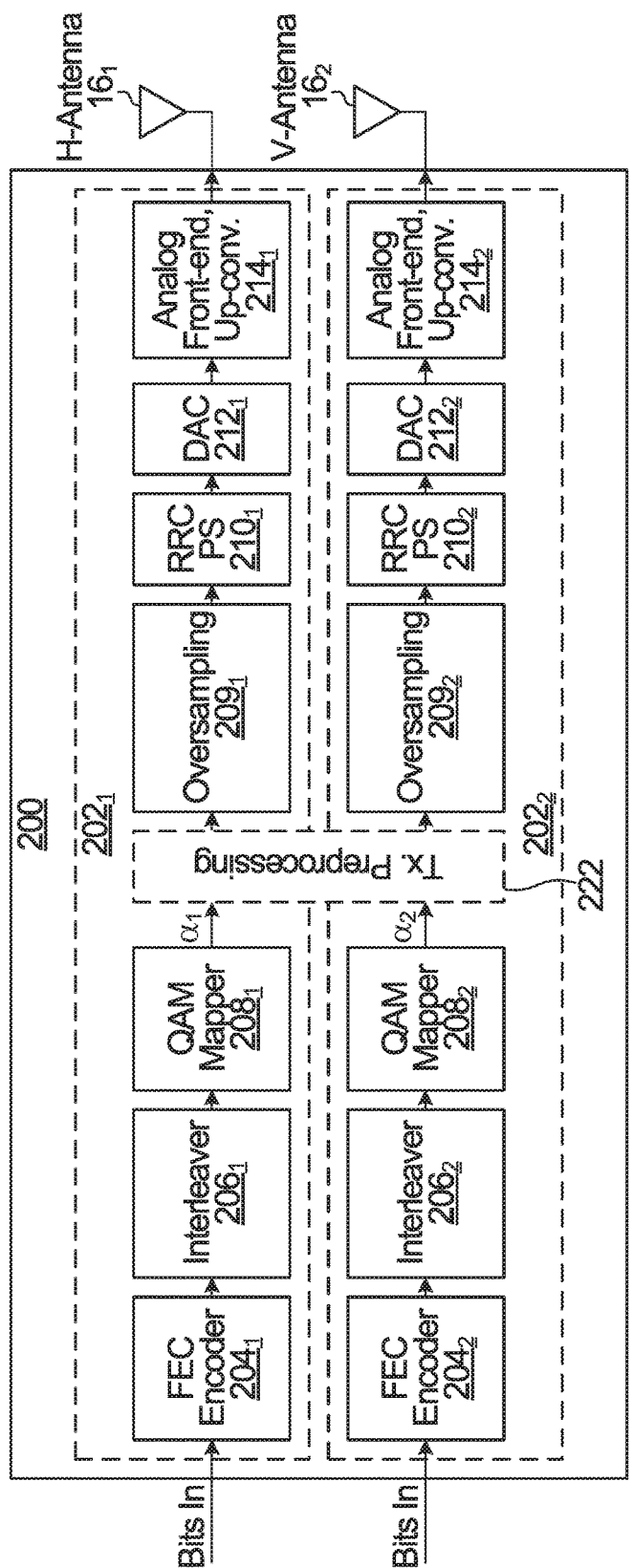
FIG. 2 is a block diagram illustrating certain components of a transmit chain in the communication system of FIG. 1, in accordance with an embodiment.

With reference to FIG. 2, there is shown a block diagram illustrating certain components of the transmit chain 200 in the communication system of FIG. 1. The transmit chain 200 includes a first branch $202_1$ and a second branch $202_2$. The first branch $202_1$ includes a forward error correction (FEC) encoder $204_1$ which is configured to encode input bits in a first transmit data stream according to an error correction code. The output of the FEC encoder $204_1$ is provided to an interleaver $206_1$ which is configured to interleave the coded bits received from the FEC encoder $204_1$, thereby providing further protection against noise on the medium 30. The output of the interleaver $206_1$, which may be a sequence of bits, is provided to a symbol mapper $208_1$. In an embodiment, the symbol mapper $208_1$ is configured to map groups of bits (e.g., 8, 9, 10, 11, 12 bits or more) into symbols that can be points in a symbol constellation. In an embodiment, the symbol mapper is a quadrature amplitude modulation (QAM) mapper. The output of the symbol mapper $208_1$ is a sequence of symbols $a_1$, each of which may be represented by a complex number.

The symbols $a_1$ are provided to an oversampler $209_1$, whose outputs are provided to a pulse shaper $210_1$, which in an embodiment may be a root raised cosine (RRC) pulse shaper, based on a pulse shape p(t). The output of the pulse shaper $210_1$ is then sampled by a digital-to-analog converter $212_1$ and up-converted by an analog front-end (transmitter AFE) $214_1$. In some embodiments the transmitter AFE $214_1$ may comprise of radio frequency (RF) mixers, power amplifiers (PAs) that amplify a given transmit signal to a level that is sufficient to maintain a certain receive power level at the receiver (while maintaining a spectral mask restriction) and the like. Further information on the structure and function of a suitable transmitter AFE (as well as a receiver AFE, see later on in this document) may be found in Chapter 4.6 of "Microwave Line-of-Sight Engineering" (2012) by P. Angueira and J. A. Romo. Finally, the output of the transmitter AFE $214_1$ is transmitted over the horizontally polarized antenna $16_1$, which is configured to emit wireless signal $18_1$.

Analogously, the second branch $202_2$ of the transmit chain 200 includes a FEC encoder $204_2$ which is configured to encode input bits in a second transmit data stream according to an error correction code. The output of the FEC encoder $204_2$ is provided to an interleaver $206_2$ which is configured to interleave the coded bits received from the FEC encoder $204_2$, thereby providing further protection against noise on the medium 30. The output of the interleaver $206_2$, which may be a sequence of bits, is provided to a symbol mapper $208_2$. In an embodiment, the symbol mapper $208_2$ is configured to map groups of bits (e.g., 8, 9 or 10 bits, without limitation) into symbols that can be points in a symbol constellation. In an embodiment, the symbol mapper is a QAM mapper. The output of the symbol mapper $208_2$ is a sequence of symbols $a_2$, each of which may be represented by a complex number.

The symbols $a_2$ are provided to an oversampler $209_2$, whose outputs are provided to a pulse shaper $210_2$, which in an embodiment may be a RRC pulse shaper, based on the pulse shape p(t). The output of the pulse shaper $210_2$ is then sampled by a digital-to-analog converter $212_2$ and up-converted by a transmitter AFE $214_2$. Finally, the output of the transmitter AFE $214_2$ is transmitted over the vertically polarized antenna $16_2$, which is configured to emit wireless signal $18_2$.

Optionally, a transmitter pre-processing stage 222 may be provided in the digital domain, after the QAM mappers $208_1$, $208_2$, e.g., between the QAM mappers $208_1$, $208_2$, and the oversamplers $209_1$, $209_2$. The purpose of the transmitter pre-processing stage 222 may be to pre-compensate for inter-symbol interference introduced by "faster-than-Nyquist" signaling as will be described later on.

Referring back to FIG. 1, the wireless signals $18_1$, $18_2$ travel over the medium 30, undergo the effects of multipath, attenuation, crosstalk and other interference, and arrive at the receiver 20. From the perspective of the receiver 20, the horizontally polarized antenna $22_1$ and the vertically polarized antenna $22_2$ each receive a composite signal.

Figure 3A:
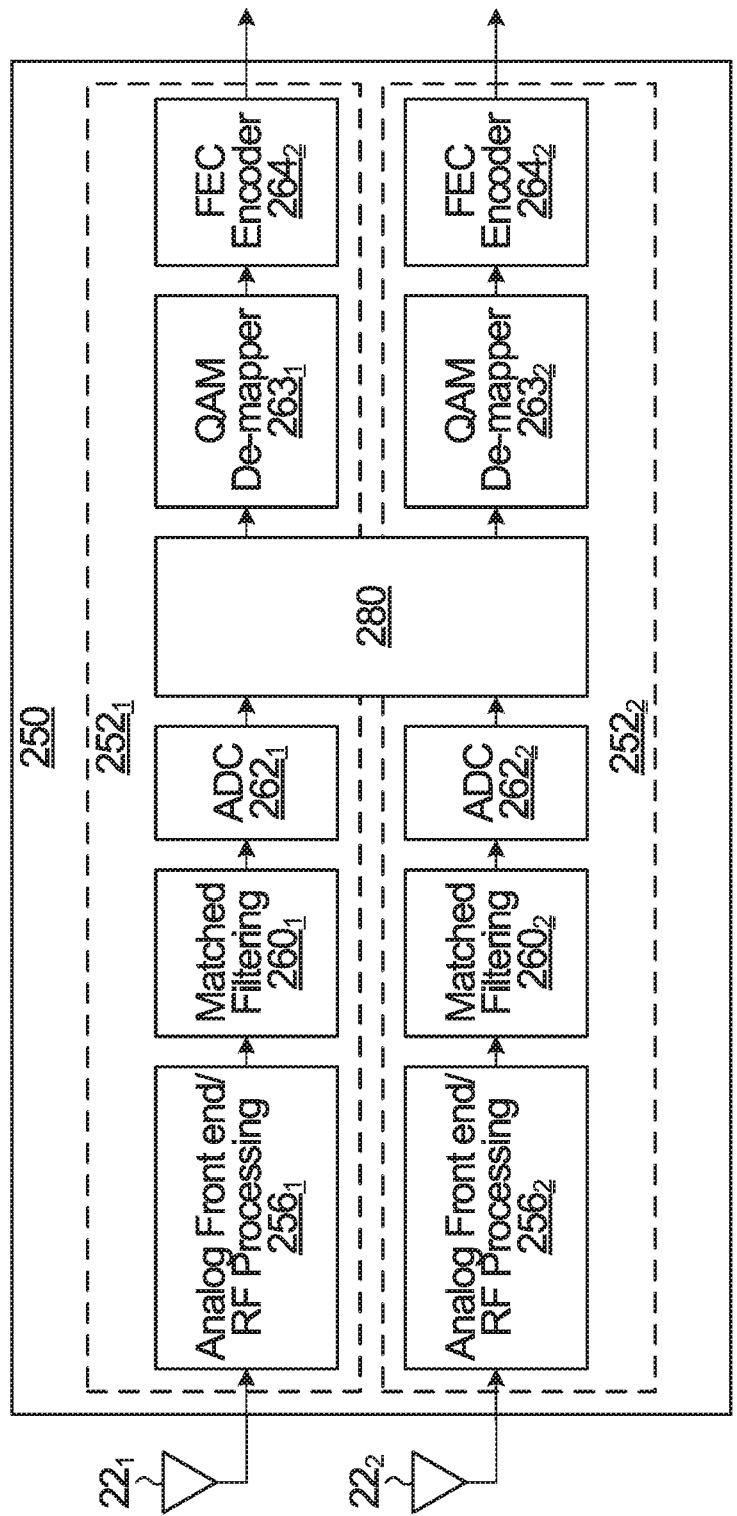
FIG. 3A is a block diagram illustrating certain components of a receive chain in the communication system of FIG. 1, including an interference mitigation apparatus, in accordance with an embodiment.

With reference now to FIG. 3A, there is shown a block diagram illustrating certain components of the receive chain 250 in the communication system of FIG. 1. The receive chain 250 includes a first branch $252_1$ and a second branch $252_2$. The first branch $252_1$ includes a receiver AFE $256_1$ that receives a horizontally polarized signal admitted by the horizontally polarized antenna $22_1$. The horizontally polarized signal will include a strong component due to wireless signal $18_1$ (as a consequence of its horizontal polarization) and a somewhat weaker component due to wireless signal $18_2$ (despite its vertical polarization, due to cross-polarization interference). The receiver AFE $256_1$ is configured to perform down-conversion of the horizontally polarized signal. The receiver AFE $256_1$ may comprise of low noise amplifiers (LNAs) and mixers to frequency downconvert the receive signal from the carrier frequency to a baseband frequency with means to block the DC component and the like. The down-converted signal is then passed to a matched filtering block $260_1$. The matched filtering block $260_1$ applies a pulse shape p*(−t), which is complex conjugated version of the pulse shape p(t) applied by the pulse shaper $210_1$, and the output of the matched filtering block $260_1$ is provided to an analog-to-digital converter (ADC, also referred to as a sampler) $262_1$ that samples the matched filter output.

In the case where an FTN signal is used by the transmitter (see later in this document), the ADC $262_1$ may sample the output of the matched filtering block $260_1$ at a pre-defined rate that is conformant to the rate of the transmitted FTN signal. As such, the sampling rate of the ADC $262_1$ may be configured to bring the received signal into the t τ-spaced domain. That is to say, the analog signal is converted to a digital signal using the ADCs $262_1$, $262_2$ with a sampling rate $$\frac{1}{\tau T},$$

where r is the faster-than Nyquist (FTN) acceleration factor and T is the symbol duration.

An interference mitigation apparatus 280 is configured to receive samples output by the ADC $262_1$ and convert them into a signal $y_1$ provided to a data decoding stage, which can include a QAM demapper $263_1$ and a FEC decoder $264_1$. The QAM demapper $263_1$ can be a soft information log likelihood ratio (LLR) computation module that provides the LLR as an input to the FEC decoder $264_1$. The FEC decoder $264_1$ is configured to apply forward error correction techniques to extract estimates of the bits of the first transmit data stream.

Analogously, the second branch $252_2$ of the receive chain 250 includes an AFE $256_2$ that receives a vertically polarized signal admitted by the vertically polarized antenna $22_2$. The vertically polarized signal will include a strong primary component due to wireless signal $18_2$ (as a consequence of its vertical polarization) and a somewhat weaker component due to wireless signal $18_1$ (despite its horizontal polarization, due to cross-polarization interference). The AFE $256_2$ is configured to perform down-conversion of the vertically polarized signal, which is then passed to a matched filtering block $260_2$. The matched filtering block $260_2$ applies a pulse shape p*(−t), which is the complex conjugated version of the pulse shape p(t) applied by the pulse shaper $210_2$, and the output of the matched filtering block $260_2$ is provided to an ADC $262_2$ that samples the matched filter output. In the case where an FTN signal is used by the transmitter (see later in this document), the ADC $262_2$ may sample the output of the matched filtering block $260_1$ at a pre-defined rate that is conformant to the rate of the transmitted FTN signal. As such, the sampling rate of the ADC $262_2$ may be configured to bring the received signal into the t spaced domain.

The interference mitigation apparatus 280 is configured to receive samples output by the ADC $262_2$ and convert them into signal $y_2$ provided to a data decoding stage, which can include a QAM demapper $263_2$ and a FEC decoder $264_2$. The QAM demapper $263_2$ can be a soft information log likelihood ratio (LLR) computation module that provides the LLR as input to the FEC decoder $264_2$. The FEC decoder $264_2$ is configured to apply forward error correction techniques to extract estimates of the bits of the second transmit data stream.

Figure 3B:
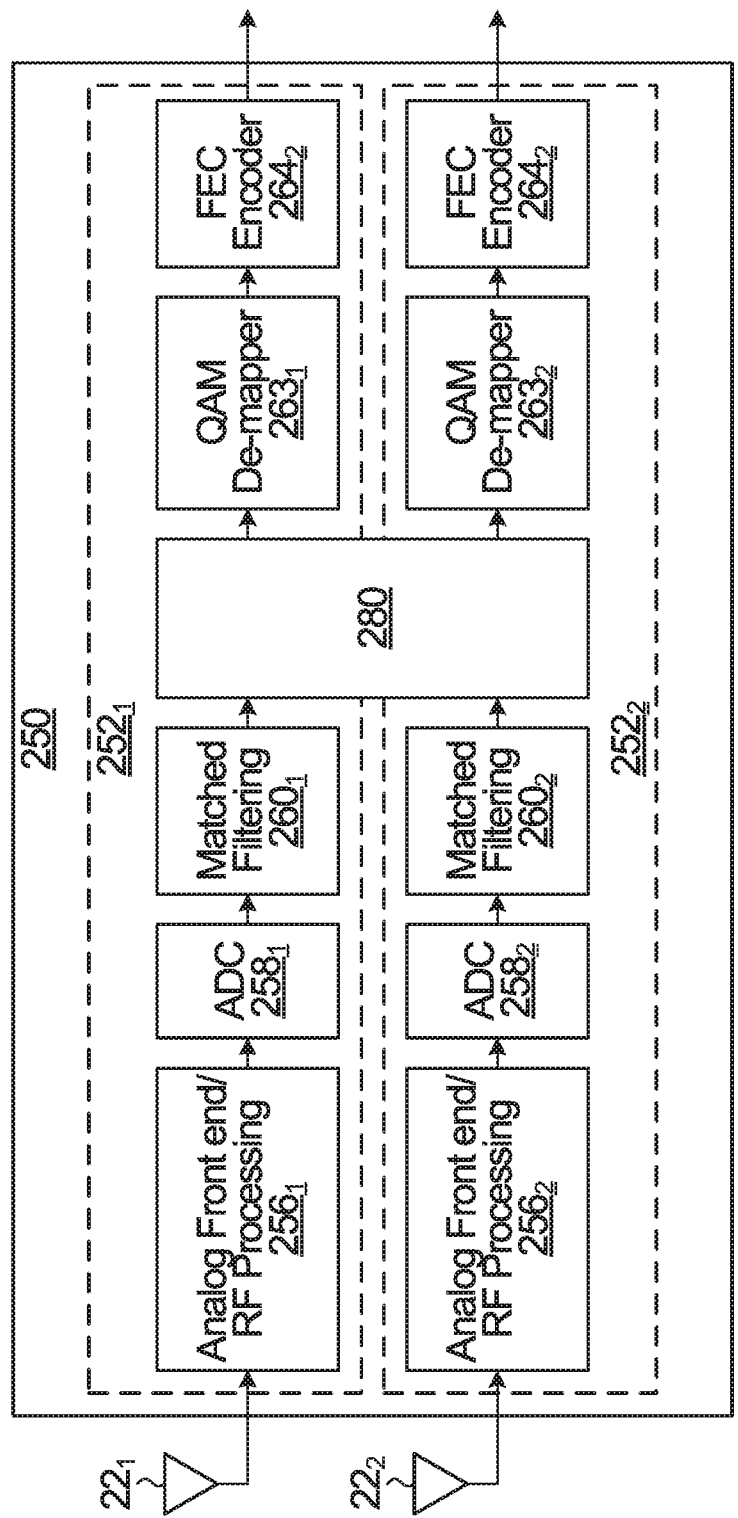
FIG. 3B is a block diagram similar to FIG. 3A, except with matched filtering occurring in the digital domain.

FIG. 3B shows an implementation of the receive chain 250 similar to the implementation of FIG. 3A, but where analog-to-digital converters $258_1$, $258_2$ perform the sampling prior to matched filtering, which occurs in the digital domain. The ADC rate here is set to be strictly higher than the symbol rate of the transmitted signal.

Figure 12:
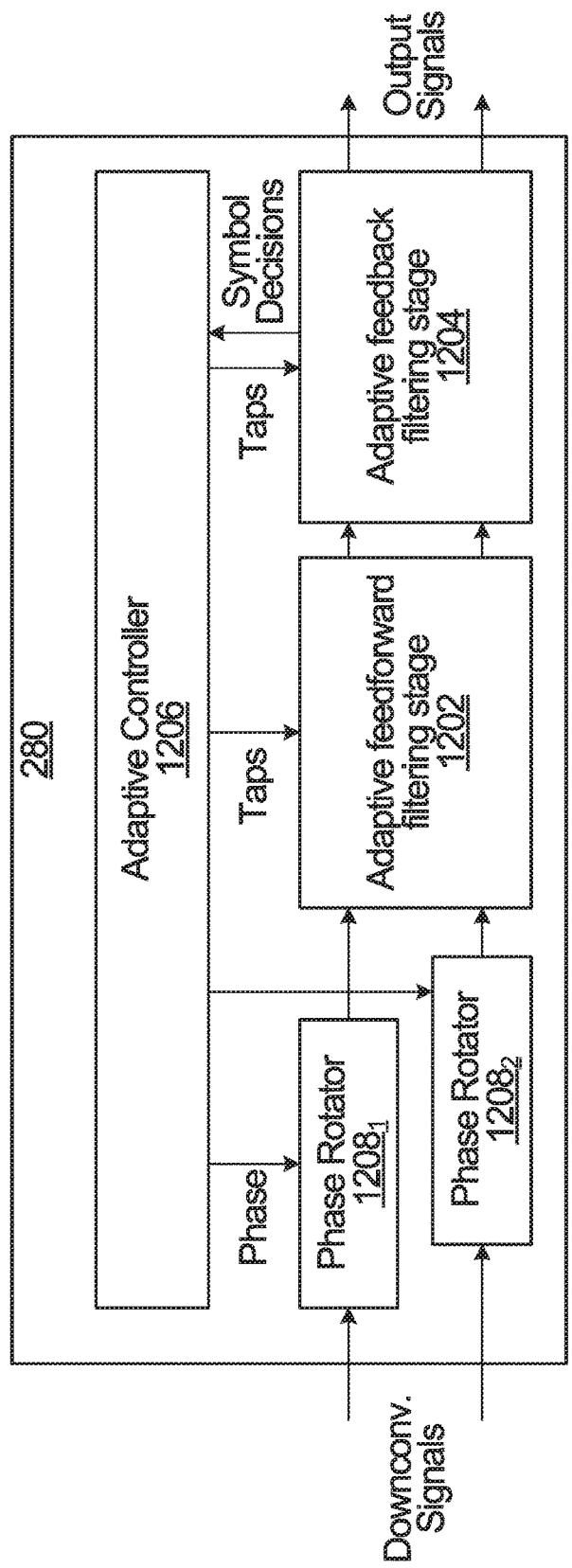
FIG. 12 is a generic block diagram of the interference mitigation apparatus of FIG. 3A, in accordance with an embodiment.

Returning now to FIG. 1, as the wireless signals $18_1$, $18_2$ travel across the medium 30, they undergo multipath effects, among others, which will cause inter-symbol interference, i.e., interference between different symbols of the wireless signal from the same transmit antenna. In addition, the orthogonally polarized wireless signals $18_1$, $18_2$ will not fully maintain their orthogonality and therefore will leak (interfere) into one another, leading to an effect known as "cross-polarization interference" (XPI). Moreover, high orders of modulation (constellation size) are sensitive to phase noise distortion, caused by imprecise mixing frequency in the local oscillator in the AFEs $256_1$, $256_2$, along with timing phase offsets within the ADC. The interference mitigation apparatus 280 is configured to apply a feedforward strategy to mitigate inter-symbol interference due to frequency selectivity of the channel and a feedback strategy to mitigate cross-polarization interference; in addition, phase rotators are used to mitigate the impact of phase noise. To this end, and with reference to FIG. 12, the interference mitigation apparatus 280 comprises an adaptive feedforward filtering stage 1202 connected to an adaptive feedback filtering stage 1204, and which produces a plurality of output signals corresponding to a plurality of frequency downconverted received signal samples after adequate matched filtering. In a non-limiting embodiment, the adaptive feedback filtering stage comprises a two-dimensional linear filter. Also provided in the interference mitigation apparatus 280 is a plurality of phase rotators $1208_1$, $1208_2$, which are configured to apply phase rotation to the frequency downconverted signals prior to processing by the adaptive feedforward filtering stage 1202 and the adaptive feedback filtering stage 1204. In this way, the phase rotators $1208_1$, $1208_2$ de-rotate the frequency downconverted signals by the opposite of the estimated phase noise so as to retrieve the transmitted signal. The amount of phase rotation applied by the phase rotators $1208_1$, $1208_2$ to the frequency downconverted signals is controlled by an adaptive controller 1206 based at least in part on symbol decisions made on the output signals.

Two non-limiting embodiments of the interference mitigation apparatus 280 are now discussed for phase noise tracking, namely combined phase noise tracking (CPNT) and individual phase noise tracking (IPNT).

Combined Phase Noise Tracking (CPNT)

Figure 4:
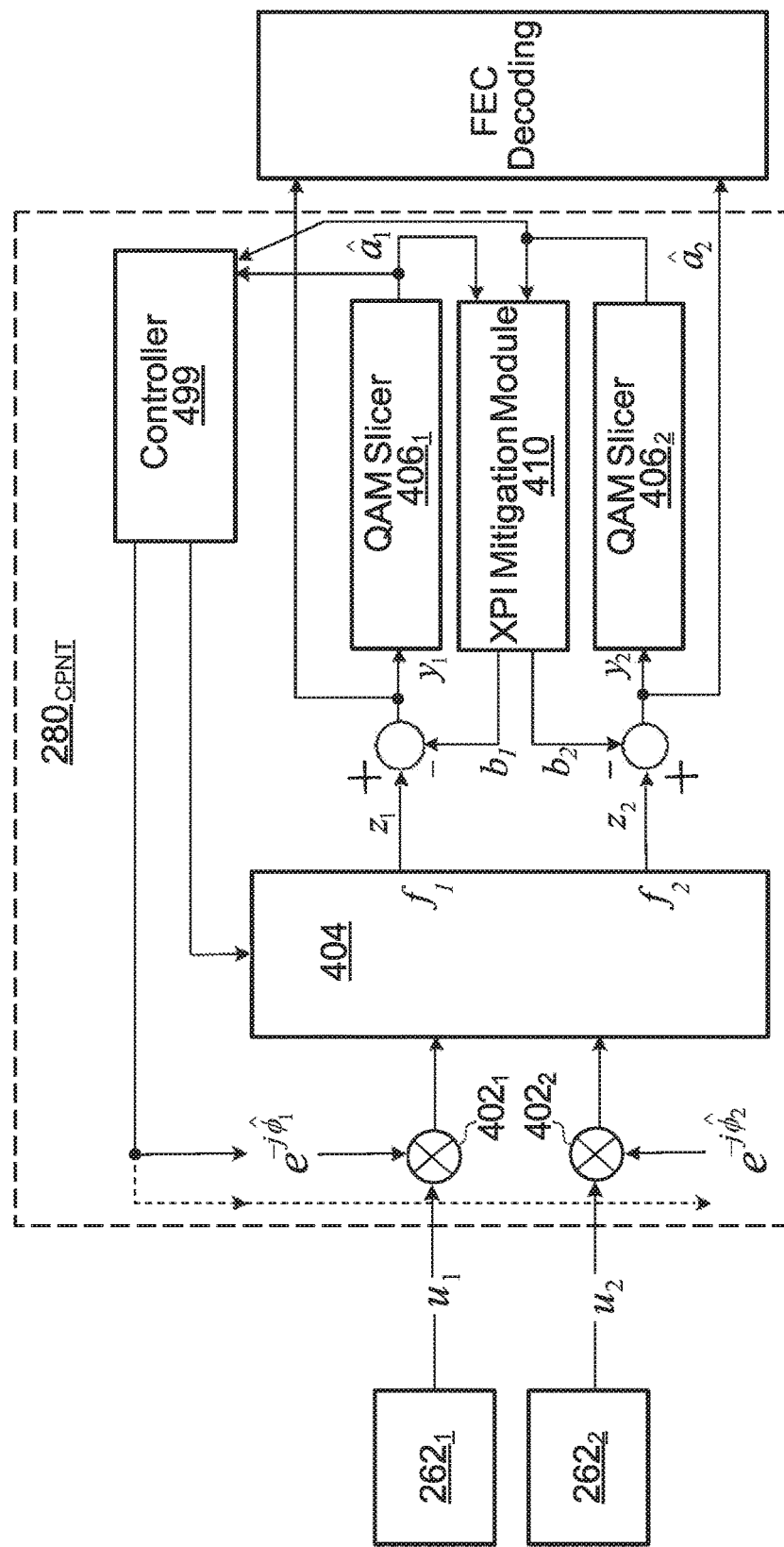
FIG. 4 is a block diagram illustrating certain components of the interference mitigation apparatus of FIGS. 3A and 3B, in a combined phase noise tracking (CPNT) embodiment.

With reference to FIG. 4, there is shown a block diagram of an interference mitigation apparatus $280_{CPNT}$ that is configured to apply combined phase noise tracking (CPNT) in order to improve performance of the receiver 20. Specifically, the interference mitigation apparatus $280_{CPNT}$ the sampled signals $u_1$, $u_2$ output by the sample rate conversion blocks $262_1$, $262_2$, respectively. Signal $u_1$ has its phase rotated by $\hat{\varphi}_1$ radians within a phase rotator $402_1$, where $\hat{\varphi}_1$ is an estimate of the phase distortion of the transmitted signal and signal $u_2$ has its phase rotated by an estimated phase of $\hat{\varphi}_2$ radians by a phase rotator $402_2$. For example, the complex signals $u_1$ and $u_2$ are multiplied by another complex term $e^{-j\hat{\varphi}_1}$ and $e^{-j\hat{\varphi}_2}$. In practice a phase rotator may be implemented using the well known CORDIC method (also known as Volder's algorithm). The resulting phase-rotated versions of the sampled signals to, $u_2$ are provided to respective inputs of an inter-symbol-interference (ISI) mitigation module (or portion) 404, which has a first output $f_1$ and a second output $f_2$. In an embodiment, the ISI mitigation module 404 is configured to implement a two-dimensional, $N_f$-tap feedforward filter according to a set of equations between its pair of inputs and its pair of outputs, as will be described later on.

The two outputs $f_1$ and $f_2$ of the ISI mitigation module 404 carry signals $z_1$ and $z_2$, respectively. Signal $z_1$ is modified by subtracting from it a feedback signal $b_1$ in order to become signal $y_1$. Analogously, signal $z_2$ is modified by subtracting from it a feedback signal $b_2$ in order to become signal $y_2$. Signal $y_1$ is provided to an input of a symbol demapper (symbol slicer) $406_1$ which is configured to produce symbol estimates $\hat{a}_1$, being estimates of corresponding ones of the (previously transmitted) symbols $a_1$. Analogously, signal $y_2$ is provided to an input of a symbol demapper (symbol slicer) $406_2$ which is configured to produce symbol estimates $\hat{a}_2$, being estimates of corresponding ones of the (previously transmitted) symbols $a_2$.

Symbol estimates $\hat{a}_1$, $\hat{a}_2$ are provided to respective inputs of a cross-polarization interference (XPI) mitigation module 410, which also has a pair of outputs. In an embodiment, the XPI mitigation module 410 is configured to implement a two-dimensional, $N_b$-tap feedback filter according to a set of equations between its pair of inputs and its pair of outputs, as will be described later on. The outputs of the XPI mitigation module 410 carry the feedback signals $b_1$ and $b_2$ mentioned above. In addition, signals $y_1$ and $y_2$ are also output to respective the QAM demappers $263_1$, $263_2$ followed by the FEC decoders $264_1$, $264_2$, which provide estimates of the input bits encoded by the transmitter 12.

In an embodiment, the ISI mitigation module 404 utilizes a two-dimensional feedforward filter with $N_f$ adaptively updated taps to process the signals at its inputs (namely, the phase-rotated versions of $u_1$ and $u_2$) in order to produce the signals at its outputs $f_1$, $f_2$, namely $z_1$ and $z_2$, respectively. The estimated phases $\hat{\varphi}_1$, $\hat{\varphi}_2$ applied by the phase rotators $402_1$, $402_2$ are also adaptively updated. Furthermore, the XPI mitigation module 410 utilizes a two-dimensional feedback filter with $N_b$ adaptively updated taps to process the signals at its inputs (namely, symbol estimates $\hat{a}_1$, $\hat{a}_2$) in order to produce the signals at its outputs, namely $b_1$ and $b_2$, respectively. The resultant signals $y_i[k]$ (where i=1 or 2, at sample k) can be represented as a function of $u_i$, $\hat{\varphi}_i$, $\hat{a}_i$, $N_f$, $N_b$, as well as the two sets $N_f$ feedforward taps $f_{i1}[v,k]$ (v=0, ..., $N_f$-1) and $f_{i2}[v,k]$ (v=0, ..., $N_f$-1), and the two sets of $N_b$ feedback taps $b_{i1}[\mu,k]$ ($\mu$=0, ..., $N_b$-1) and $b_{i2}[\mu,k]$ ($\mu$=0, ..., $N_b$-1), by the following equation:

$$y_i[k] = \sum_{j=1}^{2}\left(\sum_{v=0}^{N_f-1} f_{ij}[v,k]u_j[k-v]e^{-j\hat{\varphi}_j[k-v]} - \sum_{\mu=1}^{N_b} b_{ij}[\mu,k]\hat{a}_j[k-k_0-\mu]\right).$$

It will be noticed that all of the adaptively updated parameters mentioned above are influenced by the symbol estimates $\hat{a}_1$, $\hat{a}_2$. An adaptive controller 499 executes the process for updating these parameters and, in an embodiment, this can be a stochastic gradient descent algorithm based on least-mean-squares (LMS) update equations as follows (where $\alpha > 0$, $\delta > 0$, $\gamma > 0$ are the LMS step-size parameters).

For the outputs $f_1$, $f_2$ of the ISI mitigation module 404, the relation between the outputs at a given time instant 't+1' is related to the past output at time 't' as:

$$f_1[k+1] = f_1[k] - \alpha P[k]u_g[k]E^*_1[k]$$

$$f_2[k+1] = f_2[k] - \alpha P[k]u_g[k]E^*_2[k]$$

In the above, $E_i[k] = y_i[k] - \hat{a}_i[k-k_0]$ are the error signals, whereby it is recalled that $y_i[k] = z_i[k] - b_i[k]$ for i=1 and i=2.

Similarly, for the outputs $b_1$, $b_2$ of the XPI mitigation module 410, the relation between the outputs at a given time instant 't+1' is related to the past output at time 't' as:

$$b_1[k+1] = b_1[k] + \delta \hat{a}_g[k]E^*_1[k]$$

$$b_2[k+1] = b_2[k] + \delta \hat{a}_g[k]E^*_2[k]$$

Finally, for the phase estimates $\varphi_1$, $\varphi_2$ applied to the phase rotators $402_1$, $402_2$:

$$\varphi_1[k+1] = \varphi_1[k] - \gamma Y_1[k]$$

$$\varphi_2[k+1] = \varphi_2[k] - \gamma Y_2[k]$$

where $$f_i[k] = \left[\{f^*_{i1}[m,k]\}_{m=0}^{N_f-1}, \{f^*_{i2}[n,k]\}_{n=0}^{N_f-1}\right]^T,$$

$$b_i[k] = \left[\{b^*_{i1}[m,k]\}_{m=1}^{N_b}, \{b^*_{i2}[n,k]\}_{n=1}^{N_b}\right]^T,$$

$$u_g[k] = \left[\{u_1[k-m]\}_{m=0}^{N_f-1}, \{u_2[k-n]\}_{n=0}^{N_f-1}\right]^T,$$

$$\hat{a}_g[k] = \left[\{\hat{a}_1[k-k_0-m]\}_{m=1}^{N_b}, \{\hat{a}_2[k-k_0-n]\}_{n=1}^{N_b}\right]^T,$$

$$P[k] = \mathrm{diag}\left(\underbrace{e^{-j\hat{\varphi}_1[k]}, \ldots, e^{-j\hat{\varphi}_1[k]}}_{N_f}, \underbrace{e^{-j\hat{\varphi}_2[k]}, \ldots, e^{-j\hat{\varphi}_2[k]}}_{N_f}\right),$$

$$Y_i[k] = \cos(\hat{\varphi}_i[k])\mathrm{Im}(\psi_i[k]) - \sin(\hat{\varphi}_i[k])\mathrm{Re}(\psi_i[k]),$$

$$\psi_i[k] = f_{1i}^H[k]u_i[k]\mathcal{E}^*_1[k] + f_{2i}^H[k]u_i[k]\mathcal{E}^*_2[k],$$

$$u_i[k] = [u_i[k], \ldots, u_i[k-N_f+1]]^T,$$

$$f_{ij}[k] = [f^*_{ij}[0,k], \ldots, f^*_{ij}[N_f-1,k]]^T,$$

As is customary, ( )*, Re( ), Im( ) represent, respectively, the complex conjugate, real and imaginary part of a complex scalar, $[\ ]^H$ and $[\ ]^T$ denote the matrix Hermitian and transpose, respectively, diag( ) is the diagonal matrix formed with the elements of a vector and the expression {x[j]} denotes the corresponding row-vector.

Due to the cross-talk between the two orthogonal polarizations in a dual-polarized system shown in FIG. 2, the phase estimate $\hat{\varphi}_1$ for the horizontal polarization branch $252_1$ attempts to track the combined phase noise perturbations originating in the local oscillators of the horizontal-polarization transmitter-receiver pair and the vertical-polarization transmitter. Consequently, the accuracy of the phase noise estimates depends on the level of cross-polarization interference and hence, on the cancellation performance of the DFE (decision feedback equalizer)-based cross-polarization interference cancellation portion 410 illustrated in FIG. 4. It may be possible to improve overall performance by reducing the interdependence between the phase noise estimation and cross-polarization interference cancellation. To this end, a second joint equalization and phase noise tracking method is now described.

Independent Phase Noise Tracking (IPNT)

Figure 5:
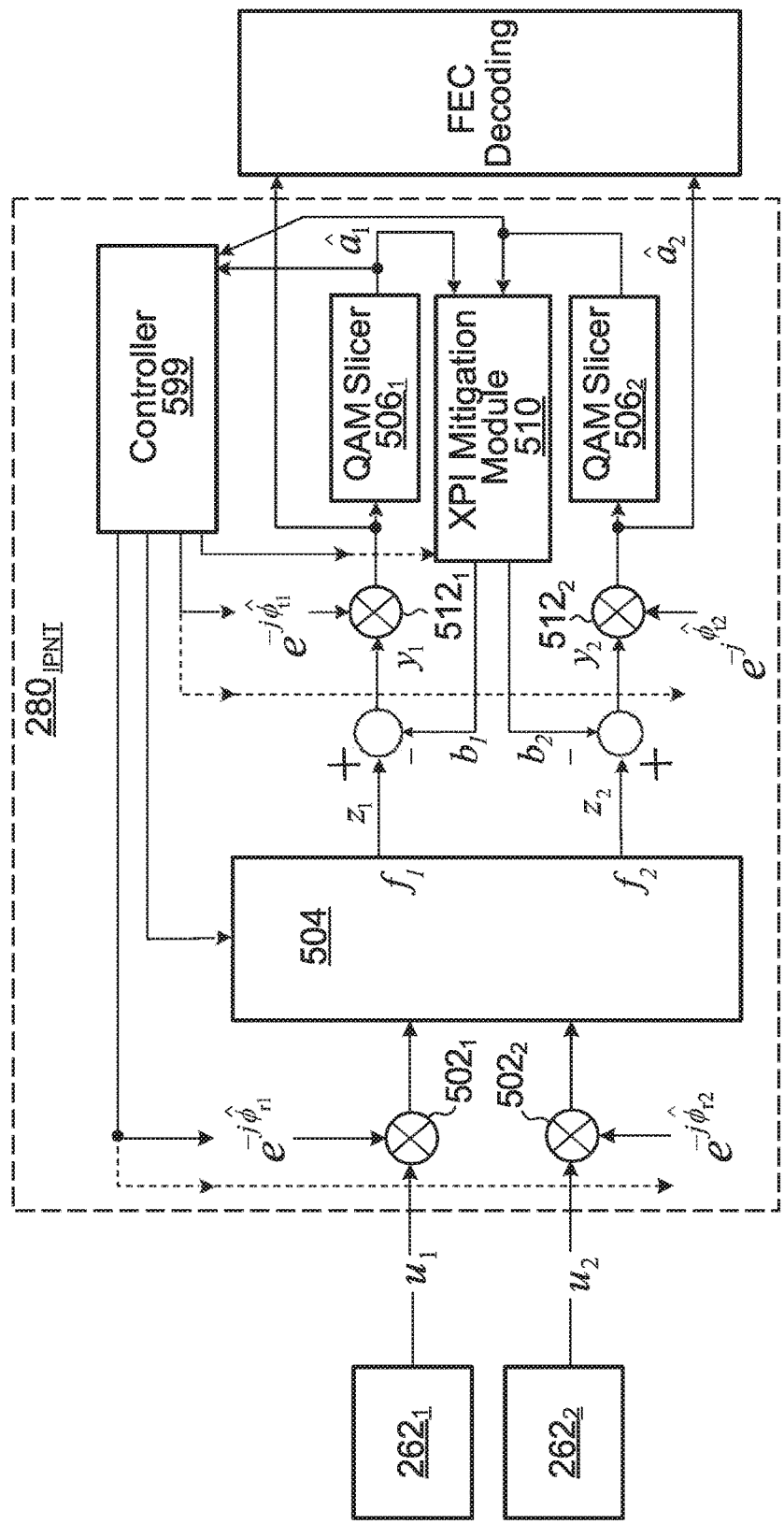
FIG. 5 is a block diagram illustrating certain components of the interference mitigation apparatus of FIGS. 3A and 3B, in an independent phase noise tracking (IPNT) embodiment.

With reference to FIG. 5, there is shown a block diagram of an interference mitigation apparatus $280_{IPNT}$ that is configured to apply independent phase noise tracking (IPNT) in order to improve performance of the receiver 20. Specifically, the interference mitigation apparatus $280_{IPNT}$ receives the sampled signals $u_1$, $u_2$ output by the sample rate conversion blocks $262_1$, $262_2$, respectively. Signal $u_1$ has its phase rotated by an estimated receiver phase $\hat{\theta}_{r1}$ by a phase rotator $502_1$, and signal $u_2$ has its phase rotated by an estimated receiver phase $\hat{\theta}_{r2}$ by a phase rotator $502_2$. The rotated signals are provided to respective inputs of an inter-symbol-interference (ISI) mitigation module 504, which also has a first output $f_1$ and a second output $f_2$. The ISI mitigation module 504 implements a two-dimensional, $N_f$-tap feedforward filter according to a set of equations between its pair of inputs and its pair of outputs, as will be described later on.

The two outputs $f_1$, $f_2$ of the ISI mitigation module 504 carry signals $z_1$ and $z_2$, respectively. Signal $z_1$ is modified by subtracting from it a feedback signal $b_1$ in order to become intermediate signal $y_1$. Analogously, signal $z_2$ is modified by subtracting from it a feedback signal $b_2$ in order to become intermediate signal $y_2$. Intermediate signal $y_1$ has its phase rotated by an estimated transmitter phase $\hat{\theta}_{t1}$ by a phase rotator $512_1$; the resultant signal is denoted $\tilde{y}_1$. Analogously, intermediate signal $y_2$ has its phase rotated by an estimated transmitter phase $\hat{\theta}_{t2}$ by a phase rotator $512_2$; the resultant signal is denoted $\tilde{y}_2$. Rotated signal $\tilde{y}_1$ is provided to an input of a symbol demapper (slicer) $506_1$ which is configured to produce symbol estimates $\hat{a}_1$, which are estimates of corresponding ones of the (previously transmitted) symbols $a_1$.

Analogously, rotated signal $\tilde{y}_2$ is provided to an input of a symbol demapper (slicer) $506_2$ which is configured to produce symbol estimates $\hat{a}_2$, which are estimates of corresponding ones of the (previously transmitted) symbols $a_2$. Symbol estimates $\hat{a}_1$, $\hat{a}_2$ are provided to respective inputs of a cross-polarization interference (XPI) mitigation module 510, which also has a pair of outputs. In an embodiment, the XPI mitigation module 510 is configured to implement a two-dimensional, $N_b$-tap feedback filter according to a set of equations between its pair of inputs and its pair of outputs, as will be described later on. The outputs of the XPI mitigation module 510 carry the feedback signals $b_1$ and $b_2$ mentioned above. In addition, rotated signals $\tilde{y}_1$ and $\tilde{y}_2$ are also output to the respective QAM demappers $263_1$, $263_2$ and FEC decoders $264_1$, $264_2$, which provide estimates of the input bits encoded by the transmitter 12.

In an embodiment, the ISI mitigation module 504 utilizes a two-dimensional feedforward filter with $N_f$ adaptively updated taps to process the signals at its inputs (namely, the phase-rotated versions of $u_1$ and $u_2$) in order to produce the signals at its outputs $f_1$, $f_2$, namely $z_1$ and $z_2$, respectively.

The receiver phase estimates $\hat{\theta}_{r1}$, $\hat{\theta}_{r2}$ as applied by the phase rotators $502_1$, $502_2$ are also adaptively updated, as are the estimated transmitter phases $\hat{\theta}_{t1}$, $\hat{\theta}_{t2}$ applied by the phase rotators $512_1$, $512_2$. Furthermore, the XPI mitigation module 510 utilizes a two-dimensional feedback filter with $N_b$ adaptively updated taps to process the signals at its inputs (namely, symbol estimates $\hat{a}_1$, $\hat{a}_2$) in order to produce the signals at its outputs, namely $b_1$ and $b_2$, respectively. The resultant signals $\tilde{y}_i[k]$ (where i=1 or 2) can be represented as a function of $u_i$, $\hat{\theta}_{ri}$, $\hat{\theta}_{ti}$, $\hat{a}_i$, $N_f$ and $N_b$ by the following equation:

$$\tilde{y}_i[k] = e^{-j\hat{\theta}_{ti}[k]} \left( \sum_{j=1}^{2} \left\{ \sum_{v=0}^{N_f-1} f_{ij}[v,k] u_j[k-v] e^{-j\hat{\theta}_{rj}[k-v]} - \sum_{\mu=1}^{N_b} b_{ij}[\mu,k] \hat{a}_j[k-k_0-\mu] \right\} \right).$$

It will be noticed that all of the adaptively updated parameters mentioned above are influenced by the estimated symbols $\hat{a}_1$, $\hat{a}_2$. An adaptive controller 599 executes the process for updating these parameters and, in an embodiment, this can be a stochastic gradient descent algorithm based on least-mean-squares (LMS) update equations as follows (where $\tilde{\alpha} > 0$, $\tilde{\delta} > 0$, $\tilde{\gamma}_t > 0$, $\tilde{\gamma}_r > 0$ are the LMS step-size parameters).

For the outputs $f_1$, $f_2$ of the ISI mitigation module 504 the update relations between the outputs at a given time instant 't+1' is related to the past output at time 't' as:

$$f_1[k+1] = f_1[k] - \tilde{\alpha} e^{-j\hat{\theta}_{t1}[k]} \tilde{P}[k] u_g[k] \varepsilon_1^*[k]$$

$$f_2[k+1] = f_2[k] - \tilde{\alpha} e^{-j\hat{\theta}_{t2}[k]} \tilde{P}[k] u_g[k] \varepsilon_2^*[k]$$

Similarly, for the outputs $b_1$, $b_2$ of the XPI mitigation module 510, the relation between the outputs at a given time instant 't+1' is related to the past output at time 't' as:

$$b_1[k+1] = b_1[k] + \tilde{\delta} e^{-j\hat{\theta}_{t1}[k]} \hat{a}_g[k] \varepsilon_1^*[k]$$

$$b_2[k+1] = b_2[k] + \tilde{\delta} e^{-j\hat{\theta}_{t2}[k]} \hat{a}_g[k] \varepsilon_2^*[k]$$

Furthermore, for the estimated receiver phases $\hat{\theta}_{r1}$, $\hat{\theta}_{r2}$ applied by the phase rotators $502_1$, $502_2$ the outputs at a given time instant 't+1' is related to the past output at time 't' as:

$$\hat{\theta}_{r1}[k+1] = \hat{\theta}_{r1}[k] - \tilde{\gamma}_r \Gamma_{r1}[k]$$

$$\hat{\theta}_{r2}[k+1] = \hat{\theta}_{r2}[k] - \tilde{\gamma}_r \Gamma_{r2}[k]$$

And for the estimated transmitter phases $\hat{\theta}_{t1}$, $\hat{\theta}_{t2}$ applied by the phase rotators $512_1$, $512_2$:

$$\hat{\theta}_{t1}[k+1] = \hat{\theta}_{t1}[k] - \tilde{\gamma}_t \Gamma_{t1}[k]$$

$$\hat{\theta}_{t2}[k+1] = \hat{\theta}_{t2}[k] - \tilde{\gamma}_t \Gamma_{t2}[k]$$

where:

$$\tilde{P}[k] = \mathrm{diag}\left( \underbrace{e^{-j\hat{\theta}_{r1}[k]}, \ldots, e^{-j\hat{\theta}_{r1}[k]}}_{N_f}, \underbrace{e^{-j\hat{\theta}_{r2}[k]}, \ldots, e^{-j\hat{\theta}_{r2}[k]}}_{N_f} \right),$$

By tracking two additional variables for phase noise mitigation, the IPNT embodiment may the outperform CPNT embodiment, especially for higher order modulation (HoM) schemes that are more vulnerable to phase noise perturbations. Numerical simulations are show later in this document.

Compensation for Faster-than-Nyquist Signalling

The signaling used in the above CPNT and IPNT embodiments can be Nyquist signaling or "faster-than-Nyquist" signaling. Faster-than-Nyquist (FTN) transmission deliberately relinquishes the time-frequency spacing requirements of adjacent symbols imposed by the Nyquist criterion. By giving up this orthogonality condition, theoretically, FTN signaling provides a higher achievable rate. However, FTN introduces inter-symbol interference (ISI). While the adaptive DFE (decision feedback equalizer) embodiments presented above (both CPNT or IPNT) do equalize the combined ISI due to FTN and multipath reflections, it may be possible to improve performance by pre-compensating for the FTN ISI at the transmitter. Specifically, unlike the ISI component induced due to multipath propagation, that is a-priori unknown, the FTN-ISI stemming from the transmitter pulse shape and the receiver matched-filter is known at the transmitter 12. Therefore, as an alternative to a combined ISI equalization, a separate time invariant equalizer or pre-equalizer can be employed for FTN-ISI mitigation at the transmitter, as now described.

Pre-equalization of the known FTN-ISI can be performed through linear or non-linear precoding at the transmitter. A linear precoding method is described but persons skilled in the art will appreciate that non-linear precoding methods can also be used. It should also be appreciated that LPE (linear pre-equalized) FTN transmission corresponds to a spectral shape modification and thus, it can also be interpreted as using a more spectrally efficient pulse shape. To counter the impact of multipath-ISI and phase noise, LPE is used in conjunction with the adaptive LMS-DFE at the receiver 20 with the CPNT or IPNT embodiments described above.

Figure 10:
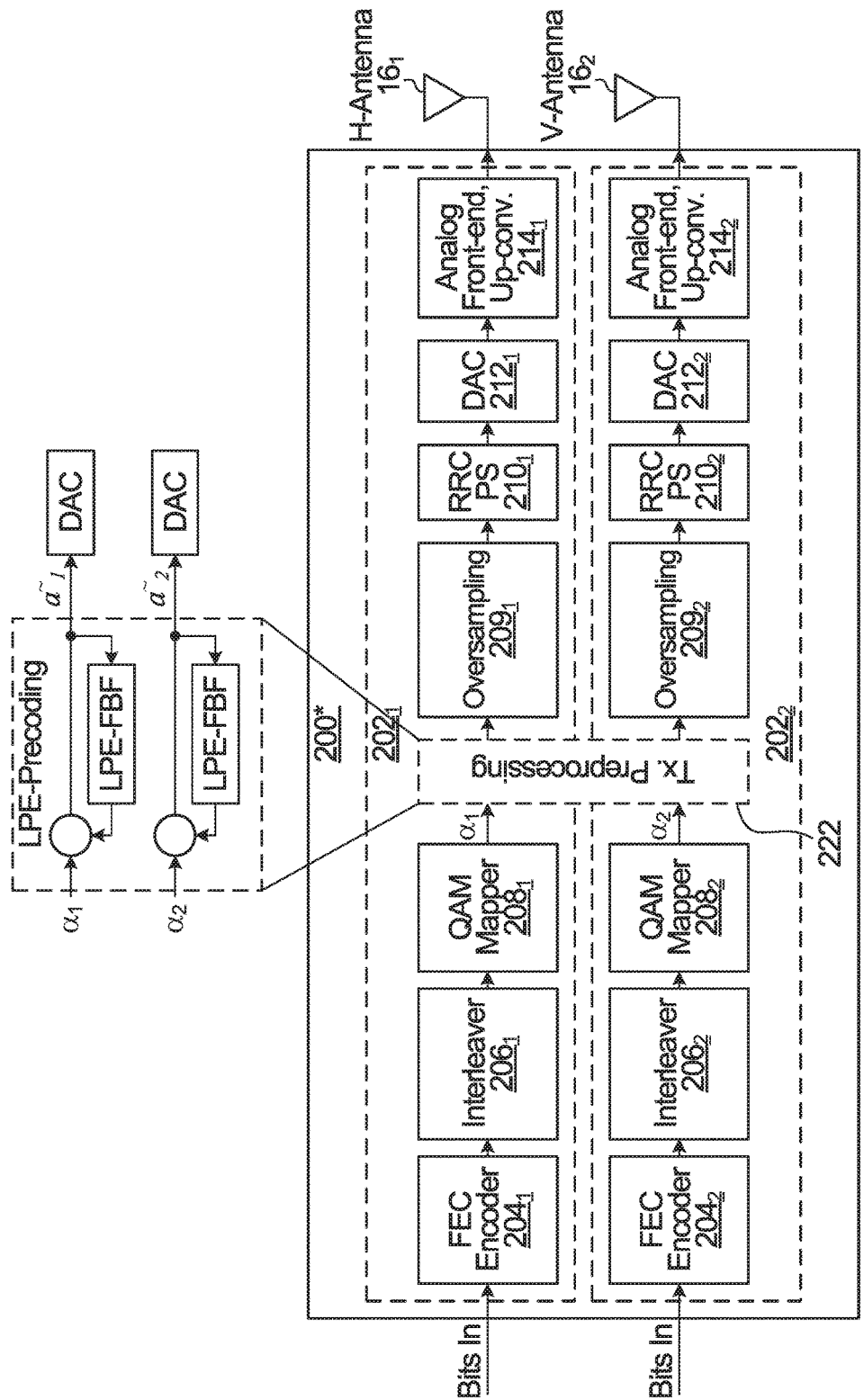
FIG. 10 is a block diagram, similar to FIG. 2, illustrating certain components of a transmit chain in the communication system of FIG. 1, further including a pre-equalizer at the transmitter to accommodate faster-than-Nyquist signalling.
Figure 11:
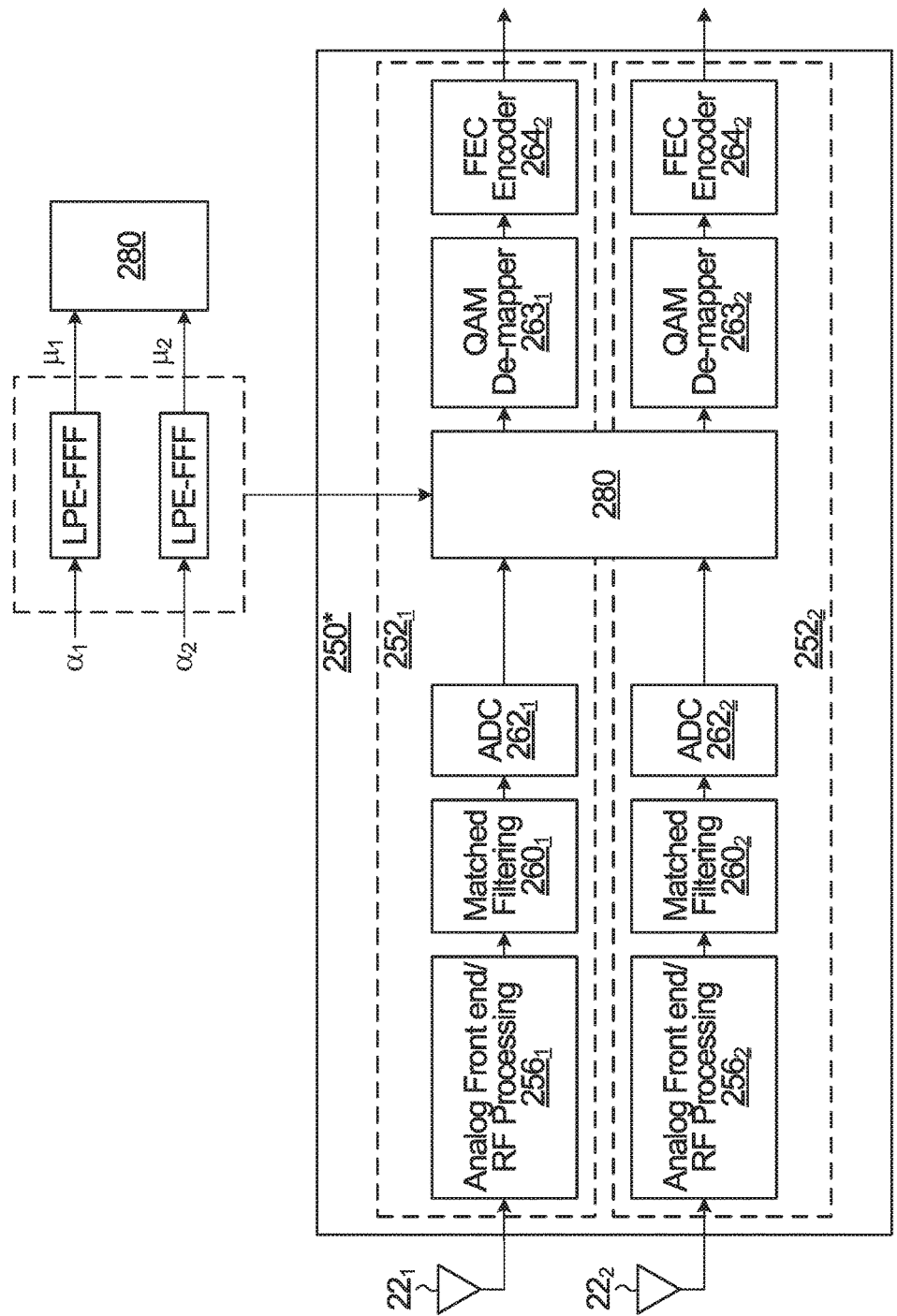
FIG. 11 is a block diagram, similar to FIG. 3A, illustrating certain components of a receive chain in the communication system of FIG. 1, further including an additional feedforward filter at the receiver to accommodate faster-than-Nyquist signalling.

FIGS. 10 and 11 illustrate the additional signal processing performed in a transmit chain 200* (similar to the transmit chain 200 in FIG. 2) and a receive chain 250* (similar to the receive chain 250 in FIG. 3A) of a dual-polarized linear pre-equalized (LPE) FTN system. In the transmit chain 200* of FIG. 10, the modulated data symbols $a_1$ and $a_2$ are filtered by respective static LPE feedback filters (LPE-FBF) to produce the sequences $a_1$ and $a_2$, respectively, before the digital-to-analog conversion and pulse-shaping. The computational details of the LPE-FBF filters can be found in Section II.B. of "Pre-Equalized Faster-Than-Nyquist Transmission", M. Jana et al., IEEE Transactions on Communications (Volume: 65, Issue: 10, October 2017), hereby incorporated by reference herein Similarly, in the receiver chain 250* shown in FIG. 11, the received symbols $u_i$, i=1, 2, are filtered by respective time invariant LPE feedforward filters (LPE-FFF) to generate sequences of samples $u_i$. The computational details of the LPE-FFF filters can also be found in Section II.B. of "Pre-Equalized Faster-Than-Nyquist Transmission", M. Jana et al., IEEE Transactions on Communications (Volume: 65, Issue: 10, October 2017), hereby incorporated by reference herein.

Thereafter, the sequences of samples $u_i$ are processed by the aforementioned adaptive interference mitigation apparatus 280 to combat the residual interference and phase noise. Since the ISI due to the FTN signaling is known at the transmitter 12 for a given pair of β and τ, the feedback filter LPE-FBF (in the transmit chain 200*) and feedforward filter LPE-FFF (in the receive chain 250*) can be computed in advance, without any feedback from the receiver 20. These two time invariant filters cooperate to mitigate ISI introduced by FTN signalling at the transmitter.

Thus, the inter-symbol interference induced by FTN can be partially eliminated for each polarization using the LPE-FFF stage at the receiver 20. The effects of the multipath ISI, XPI (cross-polarization interference) and PN (phase noise) can be subsequently compensated by the interference mitigation apparatus (e.g., the CPNT embodiment ($280_{CPNT}$) or the IPNT embodiment ($280_{IPNT}$)). Numerical simulation results are presented in the following section.

Simulation Results

Figure 6:
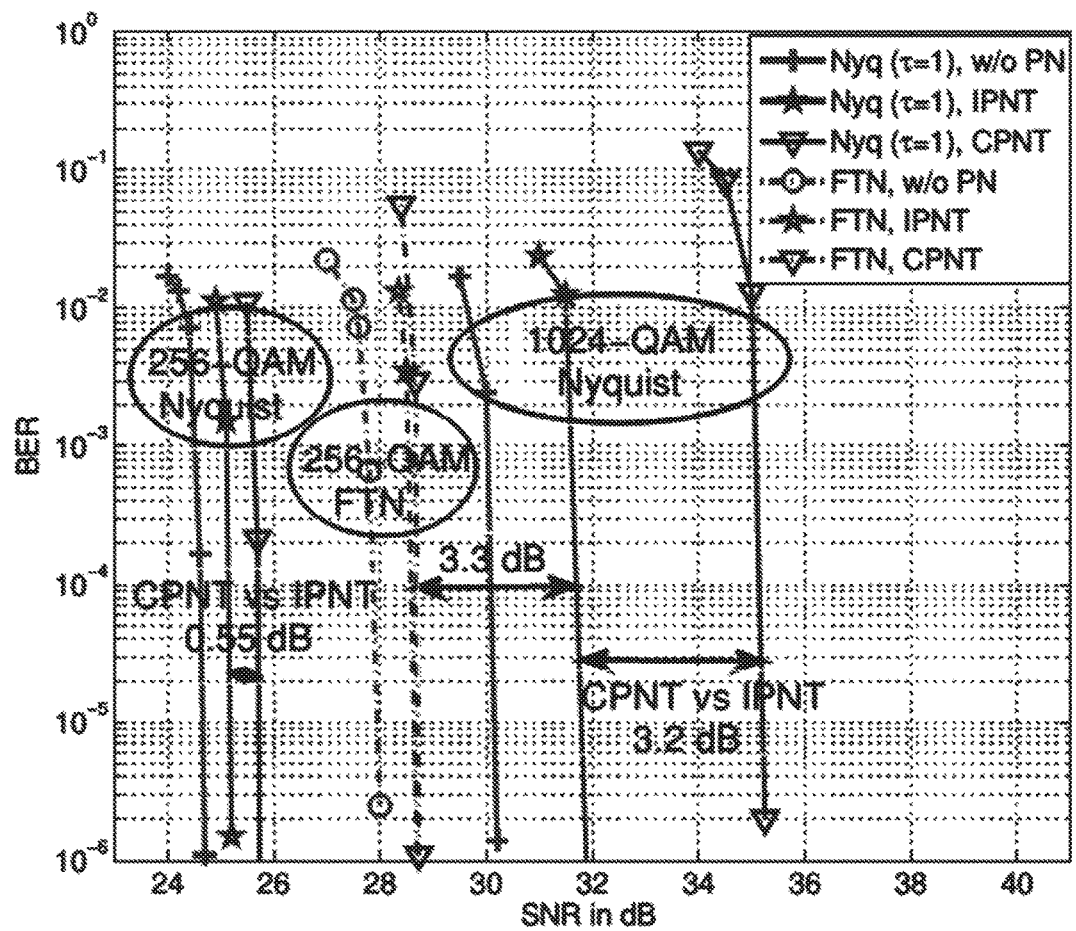
FIGS. 6 and 7 are plots of bit error rate versus signal-to-noise ratio in various implementations.

The efficiency of the methods disclosed herein can be compared by numerical simulation. In particular, FIG. 6 shows the coded bit-error rate (BER) performance averaged over two polarizations as a function of SNR (signal-to-noise ratio), measured after the equalization modules based on the adaptive LMS algorithm have converged to a steady-state. For the plots in FIG. 6, the RRC transmit pulse roll-off factor is set to 0.4, and the DP-FTN transmissions use an FTN acceleration factor of τ=0.8. As a reference, also plotted is the BER performance for the idealized case where the Nyquist and FTN transmissions are not affected by phase noise distortions, labeled as 'Nyq (τ=1), w/o PN' and TTN, w/o PN', respectively, in FIG. 6. A comparison of the CPNT and IPNT embodiments shows that the IPNT embodiment outperforms the CPNT embodiment by 0.55 dB and 3.2 dB for a Nyquist transmission, employing 256 and 1024-QAM, respectively. This indicates that the IPNT embodiment exhibits larger gains over the CPNT embodiment, particularly for higher modulation formats. Moreover, for both Nyquist and FTN transmissions with 256-QAM, performance with the IPNT method can be observed to be within 0.5 dB from that of a zero-PN system. However, the performance degradation in the presence of phase noise increases to 1.75 dB with the 1024-QAM Nyquist transmission due to enhanced vulnerability of higher modulation orders to phase noise perturbations.

In order to analyze the performance difference between Nyquist and FTN signaling, one first compares the BER of a 256-QAM Nyquist system with that of a 256-QAM FTN transmission. FIG. 6 shows that employing the same modulation order and the DFE-IPNT method, the DP-FTN method offers a 25% increase in the data rate, corresponding to an FTN acceleration factor τ of 0.8, over the DP-Nyquist system at the price of a 3.5 dB SNR penalty. Additionally, in FIG. 6, a comparison is performed between a 1024-QAM Nyquist system and a 256-QAM FTN transmission with τ=0.8, such that both systems achieve the same data rate. For example, with a 23 Mbaud Nyquist symbol rate and an LDPC code rate of 0.9, both dual polarized systems employing different modulation schemes yield a data rate of 414 Mbits/sec. FIG. 6 highlights a performance gain of 3.3 dB for the 256-QAM FTN system over the 1024-QAM Nyquist transmission. This suggests that in the presence of phase noise, with the IPNT method, a DP-FTN system can outperform a DP-Nyquist transmission that uses a higher modulation format to produce the same data rate.

However, the adaptive DFE, described above as the ISI mitigation module 404, 504, needs to equalize the combined ISI due to multipath propagation and FTN. As will be observed in the following, the BER performance of the DP-FTN transmission can be further improved by eliminating the residual FTN inter-symbol interference by way of LPE precoding at the transmitter as described above in connection with FIGS. 10 and 11.

Figure 7:
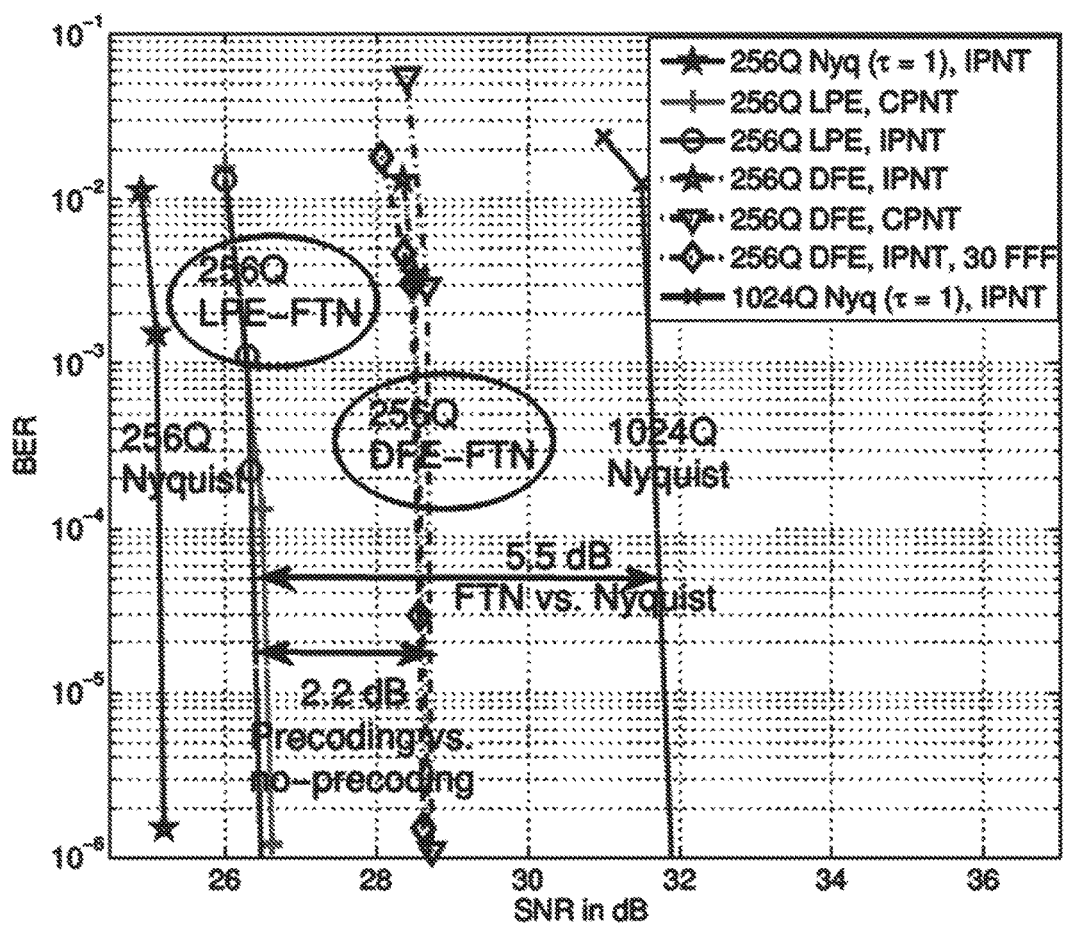

To this end, FIG. 7 shows the average BER of the two polarizations for a 256-QAM LPE precoded DP-FTN system with τ=0.4 and τ=0.8. The figure also includes the Nyquist and DFE-FTN BER curves from FIG. 6 to highlight the gains offered by precoding over unprecoded transmissions. The FTN systems for 256-QAM that employ adaptive DFE to equalize the combined ISI due to multipath and FTN-ISI are labeled by '256Q DFE, CPNT' and '256Q DFE, IPNT'. The precoded DP-FTN systems using LPE for precompensating FTN-ISI are indicated by labels '256Q LPE, CPNT' and '256Q LPE, IPNT'. It can be observed that the LPE-FTN transmission provides a performance gain of 2.2 dB over the DFE-FTN DP system. For this, LPE uses an additional time invariant feedforward filter at the receiver 20 with 15 taps before the adaptive 15-tap DFE-FFF for each polarization as described above with reference to FIG. 10. For a fair comparison between the FTN-precoded and FTN-unprecoded systems, also plotted is the BER of a DFE-FTN transmission that uses 30 taps for the adaptive DFE, labeled '256Q DFE, IPNT, 30 FFF' in FIG. 7, in order to account for the additional LPE filtering at the receiver 20. It is noted that the improvement with the longer DFE filters (30-tap instead of 15-tap) is marginal.

The benefits of the DP-FTN higher order modulation (HoM) systems considered here can be characterized by the spectral efficiency (SE) improvements they provide. The SE value for the $i^{th}$ polarization data stream (i=1, 2), with the RRC roll-off $\beta$, FTN factor $\tau$, modulation order $M_i$, and a code-rate $R_i$, can be written as:

$$SE = \frac{R_i \log_2(M_i)}{(1+\beta)\tau} \text{ bits/sec/Hz/polarization}$$

Figure 8:
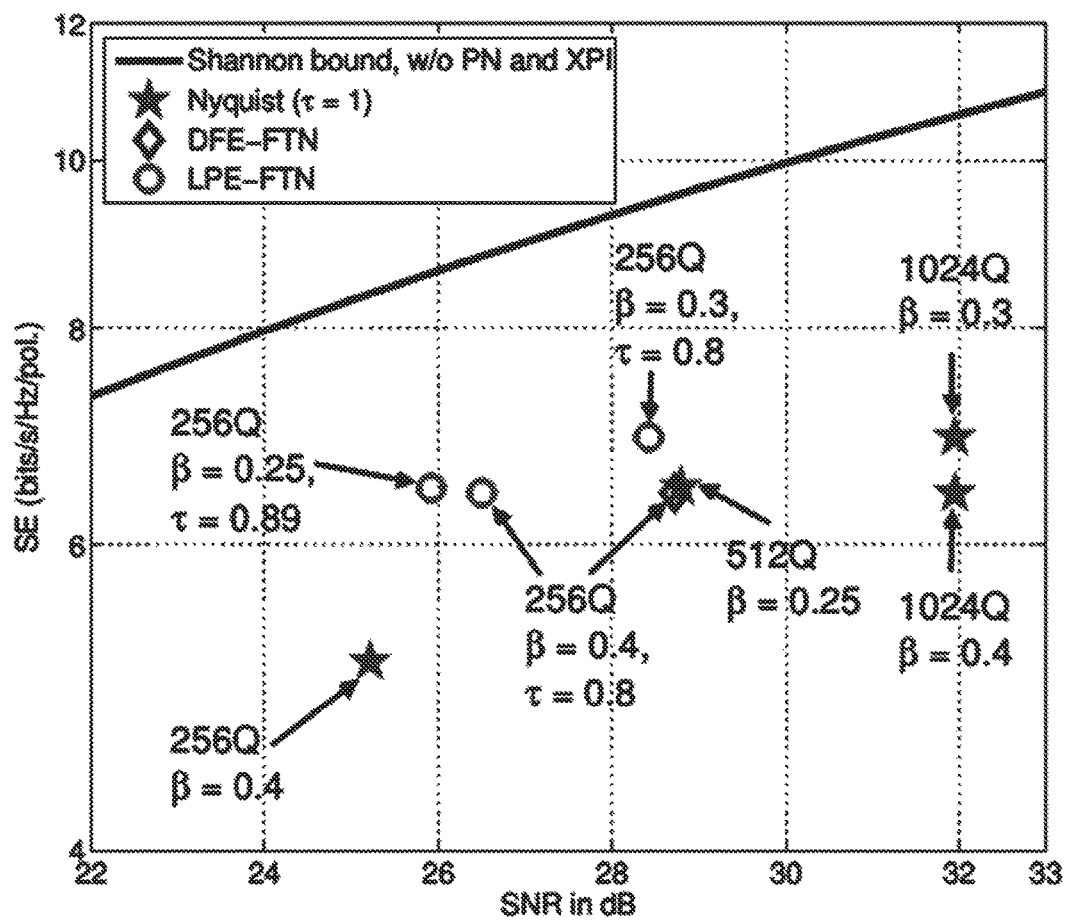
FIG. 8 is a plot of spectral efficiency versus signal-to-noise ratio for various implementations.

FIG. 8 shows the spectral efficiency achieved, per polarization, by the proposed DP-FTN systems as a function SNR, with different values of $\beta$ and $\tau$. The required SNR to attain a given spectral efficiency corresponds to an average BER of $10^{-6}$ for the respective systems.

In FIG. 8, included is the Shannon bound corresponding to a single-polarized transmission without phase noise, as a reference. As seen from FIG. 8, for example, a 256 and a 1024-QAM Nyquist transmission correspond to the spectral efficiency values 5.14 and 6.43 bits/sec/Hz/polarization, respectively, with $\beta$=0.4, and an LDPC code rate 0.9. The spectral efficiency figures improve with decreasing filter bandwidths as shown for the RRC rolloffs 0.25 and 0.3. It is noted that by using the FTN factors 0.8 and 0.89, a 256-QAM FTN system can achieve the same SE as a 1024-QAM and a 512-QAM Nyquist transmission, respectively. In FIG. 8, the comparison between the Nyquist and FTN systems that yield the same spectral efficiency shows that a 256-QAM DP-FTN system with τ=0.8, using the IPNT method and LPE precoding, can demonstrate a 5.5 dB SNR advantage compared to the 1024-QAM Nyquist system for $\beta$=0.4. When $\beta$=0.3, the gain of the DP-FTN system over the DP-Nyquist transmission reduces to 3.55 dB due to more severe FTN inter-symbol interference. Similarly, a 256-QAM DP LPE-FTN system with τ=0.89 outperforms a 512-QAM Nyquist system by an SNR margin of 2:9 dB for =0:25. Moreover, the 256-QAM recoded FTN systems with different values can be seen to offer a 12% to 25% higher SE than the 256-QAM Nyquist signaling with a 0.7-3.2 dB SNR penalty.

Figure 9:
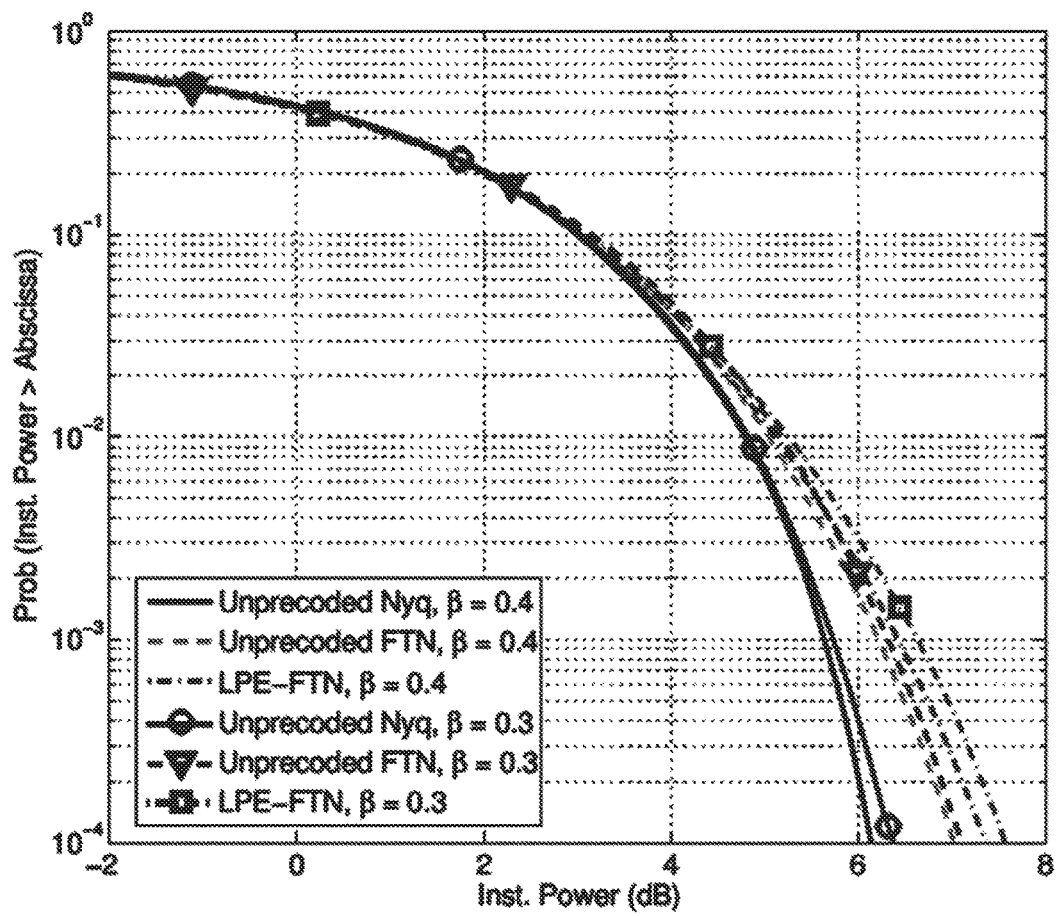
FIG. 9 plots the empirical complementary cumulative distribution function (CCDF) of instantaneous power for various implementations.

The performance benefits of the LPE precoded FTN systems may come at the expense of a possible increase in PAPR (peak-to-average power ratio). The PAPR behavior of the precoded and unprecoded 256-QAM FTN systems is investigated by plotting the empirical complementary cumulative distribution function (CCDF) of the instantaneous power in FIG. 9. With RRC roll-off 0.3 and 0.4, also included are the PAPR results for the Nyquist transmissions employing 256-QAM for comparison. All transmission schemes are normalized to the same average transmitted power of 0 dB. FIG. 9 suggests that FTN signaling can exhibit a 0.75-0.9 dB higher PAPR than the Nyquist transmission at a CCDF value $10^{-4}$. Moreover, PAPR with an FTN transmission increases slightly with reducing RRC roll-off factors as FTN-ISI grows stronger. However, as seen in FIG. 9, the LPE-precoded FTN systems yield only a marginally higher PAPR than the unprecoded FTN transmissions.

As such, methods have been provided to further increase spectral efficiency by introducing controlled ISI with performance superior to a conventional QAM system. In particular, this is achieved by FTN-based transmission system that uses linear precoding/pre-equalization (LPE) at the transmitter 12 (to mitigate ISI impact of FTN). The LPE is implemented using linear pre-filtering at the transmitter 12, without feedback information from the receiver 20. The LPE structure keeps the transceiver implementation complexity low. Overall, the methods and systems disclosed herein may allow for dual-polarized transmission with increased phase noise tolerance and/or higher throughput using lower order modulation compared to legacy QAM transmission. The methods and systems disclosed herein may also provide low-complexity phase noise mitigation for signals affected by cross-polarization interference in presence of significant ISI.

The skilled reader will readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The embodiments are also intended to cover computers programmed to perform said steps of the above-described methods.

It should be appreciated by those skilled in the art that any block diagrams herein represent conceptual views of illustrative circuitry embodying the principles disclosed herein.

Although various embodiments and examples have been presented, this was for purposes of description, but should not be considered limiting. Various modifications and enhancements will become apparent to those of ordinary skill in the art.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

The invention claimed is:

1. An interference mitigation apparatus, comprising:
   an adaptive feedforward filtering stage and an adaptive feedback filtering stage configured to produce a plurality of output signals from a plurality of frequency downconverted signals, the output signals for being provided to a data decoding stage, wherein the adaptive feedback filtering stage is in series after the adaptive feedforward filtering stage and wherein the adaptive feedforward filtering stage is configured for producing a corresponding plurality of intermediate signals and wherein the adaptive feedback filtering stage is configured for processing each of the intermediate signals to produce a corresponding one of a plurality of the output signals;

a plurality of phase rotators configured to apply phase rotation to the frequency downconverted signals prior to processing by the adaptive feedforward filtering stage and the adaptive feedback filtering stage; and an adaptive controller configured for varying an amount of the phase rotation applied by the phase rotators to the frequency downconverted signals based at least in part on symbol decisions made on the output signals.

2. The interference mitigation apparatus defined in claim 1, wherein the adaptive feedback filtering stage comprises a two-dimensional linear filter.

3. The interference mitigation apparatus defined in claim 1, wherein the adaptive feedback filtering stage comprises a two-dimensional linear filter with a plurality of taps, and wherein the adaptive controller is further configured for varying the taps based at least in part on the symbol decisions made on the output signals.

4. The interference mitigation apparatus defined in claim 3, wherein the adaptive feedforward filtering stage comprises a two-dimensional linear filter with a plurality of second taps, and wherein the adaptive controller is further configured for varying the second taps based at least in part on the symbol decisions made on the output signals.

5. The interference mitigation apparatus defined in claim 4, the adaptive controller being further configured for varying an amount of the phase rotation applied by the phase rotators based also at least in part on the frequency downconverted signals and at least one of (i) the taps and (ii) the second taps.

6. The interference mitigation apparatus defined in claim 1, wherein the adaptive feedback filtering stage is configured for subtracting from each of the intermediate signals a signal at a respective one of two outputs of a two-dimensional linear filter fed by previous symbol decisions made on the output signals, thereby to produce the output signals for forwarding to the data decoding stage.

7. The interference mitigation apparatus defined in claim 6, wherein the adaptive feedback filtering stage is further configured for providing a result of each subtracting to a respective symbol slicer for making the symbol decisions.

8. The interference mitigation apparatus defined in claim 1, wherein the adaptive feedback filtering stage is configured for subtracting from each of the intermediate signals a signal at a respective one of two outputs of a two-dimensional linear filter fed by previous symbol decisions made on the output signals, the apparatus further comprising a plurality of second phase rotators configured to apply phase rotation to the result of each subtracting, thereby to produce the output signals for forwarding to the data decoding stage.

9. The interference mitigation apparatus defined in claim 8, wherein the adaptive controller is further configured for varying an amount of the phase rotation applied by the second phase rotators based at least in part on the symbol decisions made on the output signals.

10. The interference mitigation apparatus defined in claim 1, wherein the adaptive controller is further configured for varying the amount of the phase rotation applied by the phase rotators to the frequency downconverted signals based on execution of a least-mean-squares gradient descent algorithm.

11. An interference mitigation apparatus, comprising:

an adaptive feedforward filtering stage and an adaptive feedback filtering stage configured to produce a plurality of output signals from a plurality of frequency downconverted signals, the output signals for being provided to a data decoding stage;

a plurality of phase rotators configured to apply phase rotation to the frequency downconverted signals prior to processing by the adaptive feedforward filtering stage and the adaptive feedback filtering stage; and an adaptive controller configured for varying an amount of the phase rotation applied by the phase rotators to the frequency downconverted signals based at least in part on symbol decisions made on the output signals;

a time invariant feed-forward filter applied to the frequency downconverted signals before processing by the phase rotators.

12. The interference mitigation apparatus defined in claim 11, the time invariant feed-forward filter being configured for mitigating inter-symbol interference in the frequency downconverted signals resulting from faster-than-Nyquist signaling at a transmitter of modulated wireless signals from which the frequency downconverted signals are derived.

13. The interference mitigation apparatus defined in claim 12, the plurality of frequency downconverted signals being frequency downconverted from the modulated wireless signals of respective polarizations.

14. The interference mitigation apparatus defined in claim 13, further comprising a front end for frequency downconverting the modulated wireless signals to obtain the frequency downconverted signals, the modulated signals being high-order modulation signals.

15. The interference mitigation apparatus defined in claim 14, wherein the high-order modulation signals are N-QAM signals where N is a power of two.

16. The interference mitigation apparatus defined in claim 11, wherein the adaptive feedback filtering stage is in series after the adaptive feedforward filtering stage.

17. The interference mitigation apparatus defined in claim 16, wherein the adaptive feedforward filtering stage is configured for producing a corresponding plurality of intermediate signals and wherein the adaptive feedback filtering stage is configured for processing each of the intermediate signals to produce a corresponding one of a plurality of the output signals.

18. An interference mitigation method, comprising:

frequency downconverting a plurality of modulated signals of respective polarizations to produce a corresponding plurality of frequency downconverted signals;

processing the frequency downconverted signals with an adaptive feedforward filtering stage and an adaptive feedback filtering stage to produce a corresponding one of a plurality of output signals, the output signals for being provided to a data decoding stage;

applying phase rotation to the frequency downconverted signals prior to said processing, wherein an amount of the phase rotation applied to the frequency downconverted signals is adaptively controlled based at least in part on symbol decisions made on the output signals.

19. The method defined in claim 18, the adaptive feedforward filtering producing a corresponding plurality of intermediate signals, the adaptive feedback filtering stage processing each of the intermediate signals to produce a corresponding one of a plurality of the output signals, the adaptive feedback filtering stage subtracting from each of the intermediate signals one of two signals output by a two-dimensional linear filter fed by previous symbol decisions made on the output signals, applying phase rotation to the result of each subtracting, thereby to produce the output signals for forwarding to the data decoding stage.

20. A communication system, comprising:
a transmitter configured to send a plurality of orthogonally polarized signals containing transmit data using faster-than-Nyquist transmission;
a receiver comprising a plurality of orthogonally polarized antennas to produce a corresponding plurality of received signals from a composite received version of the polarized signals, the receiver configured to process each of the received signals by applying adaptively controlled amounts of phase rotation; processing with an adaptive feedforward filtering stage; and processing with an adaptive feedback stage to obtain output signals, whereby the output signals are decoded by a data decoding stage to obtain estimates of the transmit data.

21. The communication system defined in claim 20, wherein the receiver comprises a controller for adaptively controlling the amounts of phase rotation, the adaptive feedforward filtering stage and the adaptive feedback filtering stage based on symbol decisions made on the output signals.

22. The communication system defined in claim 21, wherein the transmitter is configured to pre-process the signals by a pre-equalizer, and wherein the receiver is configured to process each of the received signals with a time invariant feedforward filter that cooperates with the pre-equalizer to mitigate ISI introduced by faster-than-Nyquist signaling at the transmitter.

23. The communication system defined in claim 21, wherein the adaptive feedforward filtering stage is configured for producing a corresponding plurality of intermediate signals and wherein the adaptive feedback filtering stage is configured for processing each of the intermediate signals to produce a corresponding one of a plurality of the output signals.

24. The communication system defined in claim 23, wherein the adaptive feedback filtering stage is configured for subtracting from each of the intermediate signals a signal at a respective one of two outputs of a two-dimensional linear filter fed by previous symbol decisions made on the output signals, the apparatus further comprising a plurality of second phase rotators configured to apply phase rotation to the result of each subtracting, thereby to produce the output signals for forwarding to the data decoding stage.

25. An interference mitigation method, comprising:
frequency downconverting a plurality of modulated wireless signals of respective polarizations to produce a corresponding plurality of frequency downconverted signals;
processing each of the frequency downconverted signals to produce a corresponding one of a plurality of output signals in which there is less inter-symbol-interference and cross-polarization interference than in the frequency downconverted signal, the output signals for being provided to a data decoding stage;
applying phase rotation to the frequency downconverted signals prior to said processing, wherein an amount of phase rotation is adaptively controlled based at least in part on symbol decisions made on the output signals.

26. The interference mitigation method defined in claim 25, wherein processing each of the frequency downconverted signals comprises applying a time invariant filter to mitigate inter-symbol-interference resulting from FTN signaling at a transmitter of the modulated wireless signals.

27. An interference mitigation apparatus, comprising:
an inter-symbol-interference (ISI) mitigation portion with a plurality of inputs and a plurality of outputs, the inputs for receiving corresponding demodulated signals of respective polarizations;
a cross-polarization interference (XPI) mitigation portion with a plurality of inputs and a plurality of outputs, the inputs being connected respectively to the outputs of the ISI mitigation portion, the outputs of the XPI mitigation portion for being provided to a data decoding stage; and
a plurality of phase rotators for phase rotating the demodulated signals provided to the inputs of the ISI mitigation portion, the phase rotators being adaptively controlled based at least in part on symbol decisions made on the outputs of the XPI mitigation portion.

28. The interference mitigation apparatus defined in claim 27, further comprising a pre-equalizer for mitigating ISI resulting from faster-than-Nyquist signaling.

\* \* \* \* \*